United States Patent [19]
Miskel et al.

[11] 3,867,521
[45] Feb. 18, 1975

[54] METHOD FOR ABSORPTION OF DRUGS

[75] Inventors: John J. Miskel, Bloomfield Hills; Foo Song Hom, Saint Clair Shores, both of Mich.

[73] Assignee: R. P. Scherer Corp., Detroit, Mich.

[22] Filed: Feb. 7, 1972

[21] Appl. No.: 224,300

Related U.S. Application Data

[63] Continuation-in-part of Ser. No. 67,276, Aug. 26, 1970, abandoned, which is a continuation-in-part of Ser. No. 3,188, Jan. 15, 1970, abandoned.

[52] U.S. Cl............................ 424/37, 424/4, 424/9, 424/78
[51] Int. Cl......... A61j 3/07, A61j 3/10, A61k 9/04
[58] Field of Search................................ 424/37, 78

[56] References Cited
UNITED STATES PATENTS

| | | | |
|---|---|---|---|
| 2,889,252 | 6/1959 | Valentine et al. | 206/84 |
| 2,938,832 | 5/1960 | Huggins et al. | 424/313 |
| 2,953,496 | 9/1960 | Phillips | 424/358 X |
| 3,140,232 | 7/1964 | Noseworthy | 424/227 |
| 3,150,043 | 9/1964 | Lafon | 424/19 |
| 3,202,578 | 8/1965 | Parker | 424/78 |
| 3,248,289 | 4/1966 | Shinozaki et al. | 424/278 X |
| 3,308,217 | 3/1967 | Lowy et al. | 264/117 |
| 3,401,218 | 9/1968 | Misher | 424/78 |
| 3,465,083 | 9/1969 | Bartley et al. | 424/342 |

FOREIGN PATENTS OR APPLICATIONS

| | | |
|---|---|---|
| 1,051,240 | 12/1966 | Great Britain |
| 763,930 | 7/1967 | Canada |
| 1,126,289 | 9/1968 | Great Britain |
| 5,705M | 1/1968 | France |

*Primary Examiner*—Shep K. Rose
*Attorney, Agent, or Firm*—Molinare, Allegretti, Newitt & Witcoff

[57] ABSTRACT

A method for enhancing drug or antibiotic blood levels by inducing gastrointestinal hypomotility and resultant delayed gastrointestinal transport thus increasing dwell time in the upper portion of the gastrointestinal tract where many drugs, particularly antibiotics, are preferentially absorbed. The method involves orally administering, simultaneously or sequentially, a drug, such as an antibiotic, and about 10–95 percent by weight of a non-anticholinergic antispasmodic agent, which is not absorbed and which has no systemic activity. Preferably, the administration is accomplished by orally administering a composition comprising the drug and the polymer simultaneously in conventional oral dosage form, preferably in a soft gelatin capsule. The agent is a polyoxypropylene-polyoxyethylene block polymer having the formula:

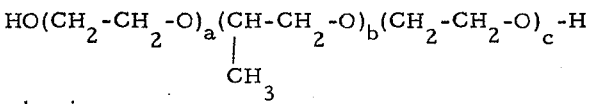

wherein
  $b$ represents a molecular weight of at least 900 and $a$ and $c$ represent a molecular weight of about 5 – 80 percent of the total molecular weight of the polymer.

6 Claims, No Drawings

METHOD FOR ABSORPTION OF DRUGS

REFERENCE TO RELATED CASES

This is a continuation-in-part of our co-pending application Ser. No. 67,276, filed Aug. 26, 1970 now abandoned, which is a continuation-in-part of U.S. Patent Application Ser. No. 3188, filed Jan. 15, 1970, now abandoned.

BACKGROUND OF THE INVENTION, FIELD OF THE INVENTION AND DESCRIPTION OF THE PRIOR ART

This invention relates a method for enhancing drug blood levels, particularly those of antibiotics, by inducing gastrointestinal hypomotility and resultant delayed gastrointestinal transport, thereby increasing dwell time of the drug in the upper portion of the gastrointestinal tract, where the drug is preferentially absorbed.

The invention is most advantageously used in enhancing the blood levels of antibiotics. Among the antibiotics are included the tetracyclines, griseofulvin and chloramphenicol. According to Goodman and Gilman, *The Pharmacological Basis of Therapeutics*, page 1,246, the tetracyclines are adequately but incompletely absorbed from the gastrointestinal tract. Absorption is most active in the stomach and upper small intestine, and it is much less effective in the lower portion of the intestinal tract and is negligible from the colon. After a single oral dose, the peak plasma levels of the tetracyclines are attained in 2 to 4 hours, and persist for 6 hours or longer. A 6 hour interval between doses is normally recommended. The administration of 250 mgs. every 6 hours produces plasma concentrations of 1–3 micrograms per ml. after the second dose, and these levels are maintained during continued treatment.

Also, according to Goodman and Gilman, page 1,297, the oral administration of griseofulvin produces peak plasma concentrations in about four hours. There is a considerable variation and fluctuation in plasma drug level in the same subject given equal quantities. This is believed to be due to difficulty in absorption from the intestine, primarily the upper small intestine, because of the insolubility of griseofulvin in an aqueous media.

As to chloramphenicol, Goodmand and Gilman, page 1,261, state that it is rapidly absorbed from the gastrointestinal tract. Significant plasma levels are obtained within 30 minutes and peak concentration is reached in about 2 hours.

In addition to the antibiotics, drugs generally are preferentially absorbed in the upper gastrointestinal tract. Thus, although the present invention may find its most important application in treatment with antibiotics, the inventive method may advantageously be used in treatment with a wide variety of drugs. Among the drugs are included the corticosteriods, steroidal hormones, synthetic estrogens, thiazide diuretics, carbamate tranquilizers, phenothiazine tranquilizers, natural and synthetic anti-hypertensives, nitrate ester cardiac vasodilators, coumarin derived anticoagulants, barbiturates, sulfa drugs, digitalis glycosides, sulfonylurea hypoglycemic agents, urinary antiseptics such as nalidixic acid and antitubercular drugs such as isoniazid, and non-steroid anti-inflammatory agents, such as phenylbutazones.

SUMMARY OF THE INVENTION

It is therefore an important object of the invention to provide a method for reducing normal peristaltic action so as to produce a condition of hypomotility and resultant enhanced drug absorption by orally administering, simultaneously or sequentially, a drug substance, such as an antibiotic, and a polyoxypropylene-polyoxyethylene block polymer.

It is also an object of the invention to provide an improved method for enhancing the absorption of an antibiotic by administering an antibiotic, such as a tetracycline, griseofulvin and chloramphenicol, and a polyoxypropylene-polyoxyethylene block polymer.

It is a further object of the invention to provide a method for treatment of animals, including humans, with tetracycline by orally administering a composition, preferably in capsule form, comprising tetracycline and a polyoxypropylene-polyoxyethylene block polymer, wherein the combination of ingredients results in the enhancement of the absorption of the tetracycline into the blood.

Further purposes and objects of this invention will appear as the specification proceeds.

It has now been discovered that the foregoing objects may be accomplished by orally administering to animals, either simultaneously or sequentially, about 5–90 percent by weight of a drug substance, such as an antibiotic, and about 10–95 percent by weight of a polyoxypropylene-polyoxyethylene block polymer having the formula:

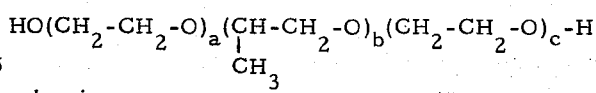

wherein
  $b$ represents a molecular weight of at least 900 and $a$ and $c$ represent a molecular weight of about 5–80 percent by weight of the total molecular weight of the polymer. The results attained by the foregoing method have been quite unexpected in view of the rather frequent use of polymers of the above type in pharmaceutical preparations. For example, according to U.S. Pat. No. 3,401,218, certain polyoxypropylene-polyoxyethylene block polymers have been found to depress or eliminate abnormal gastrointestinal motility. More specifically, these compositions have been found to be useful in the treatment of a disease entity: spasticity or hypermotility of the gastrointestinal tract. The reference, however, does not suggest that the polymer can be used to reduce normal peristaltic action to induce a transient condition of hypomotility. These polymers (commercially available under the "Pluronics" trademark from Wyandotte Chemical Company) have not been used previously for enhancing drug blood levels by increasing absorption efficiency through the device of delaying transit of antibiotics and other drugs through the upper gastrointestinal tract.

Also, such polymers have been used with antibiotics, such as tetracycline, for various purposes. Thus, in U.S. Pat. No. 3,140,232, such polymers were used to improve the color stability of a tetracycline antibiotic. In U.S. Pat. No. 2,854,378, the polymer was used to make a vaginal or rectal suppository which remains solid at temperatures below 50°C. None of the known prior art suggests the applicants' method of enhancing the drug level of orally administered drugs, particularly antibiotics, by treatment with the foregoing method.

DESCRIPTION OF THE PREFERRED EMBODIMENT

Generally, our invention comprises a method for enhancing the dwell time of a drug in the upper part of the gastrointestinal tract through the induction of hypomotility. The method is carried out by orally administering, preferably in a capsule, a composition including a drug, such as an antibiotic, and about 10-95 percent by weight of a polyoxypropylene-polyoxyethylene block polymer having the formula:

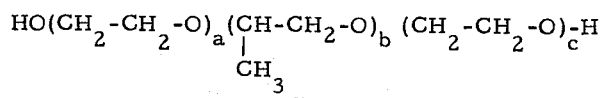

wherein
$b$ has a molecular weight of at least 900 and $a$ and $c$ represent a molecular weight of about 5 to 80 percent of the total molecular weight of the polymer.

Although the description hereafter will relate generally to administration of a composition comprising the drug and the block polymer in a conventional oral dosage form, such as in soft gelatin capsules, hard shell capsules and compressed tablets, it is to be understood that the drug and the polymer may be administered separately and sequentially. Thus, the polymer, in the proper amount, may be administered first and the drug may, immediately thereafter, be administered; or, alternatively the drug may be administered first and the polymer immediately thereafter. Preferably, however, the treatment is accomplished by simultaneously administering the polymer and the drug as a composition in a conventional oral dosage form.

Antibiotics having particularly advantageous results with our method include tetracycline, griseofulvin and chloramphenicol. By the term "tetracyclines," we mean to include tetracycline, 4-(dimethylamino)-1, 4, 4a, 5, 5a, 6, 11, 12a-octahydro-3, 6, 10, 12, 12a-pentahydroxy-6-methyl-1, 11-dioxo-2-naphthacenecarboxamide, and derivatives of tetracycline including chlortetracycline, oxytetracycline, dimethylchlortetracycline, methacycline, and doxycycline, all as bases, salts or hydrates. By the designation "chloramphenicol" we mean to include chloramphenicol, D(-)-threo-2, 2-dichloro-N-[-$\beta$-hydroxy-$\alpha$-(hydroxymethyl)-p-nitrophenethyl] acetamide, and its esters including chloramphenicol palmitate, chloramphenicol pantothenate, chloramphenicol succinates and their sodium salts.

By the term "griseofulvin" we mean to include macro and micro crystalline griseofulvin, 7-chloro-2', 4, 6-trimethoxy-6'-methylspiro-[benzofuran-2(3H), 1'-(2) cyclohexene]-3, 4'-dione.

In addition to the foregoing, other drugs amenable to enhanced absorption as a result of delayed transit include corticosteriods, steroidal hormones, synthetic estrogens, thiazide diuretics, carbamate tranquilizers, phenothiazine tranquilizers, natural and synthetic antihypertensives, nitrate ester cardiac vasodilators, coumarin derived anticoagulants, barbiturates, sulfa drugs, digitalis glycosides, sulfonylurea hypoglycemic agents, urinary antiseptics such as nalidixic acid and antitubercular drugs such as isoniazide, and non-steroid anti-inflammatory agents, such as phenylbutazones.

The aforesaid polymer acts as a non-anticholinergic, antispasmodic which reduces normal motility or peristaltic action of the gastrointestinal tract so that the antibiotic is more readily absorbed in the upper part of the gastrointestinal tract, namely, in the stomach and the upper part of the small intestine. The composition results in a delay in transit of the drug through the gastrointestinal tract. This increases dwell time of the antibiotic in the upper part of the small intestine and in the stomach. Optimally, the polymer is present at about 30–90 percent by weight of the total weight of the polymer and antibiotic.

Advantageously, $b$ of the aforementioned formula represents a molecular weight of about 950–4,000 and the total of $a$ and $c$ represents a molecular weight of about 10–80 percent by weight of the total molecular weight of the polymer. Preferably $b$ represents a molecular weight of about 2,050–2,250 and $a$ and $c$ represent a molecular weight of about 30–50 percent by weight of the total molecular weight of the polymer. These polymers are non-ionic, surface active agents and are manufactured by Wyandotte Chemical Company under the trademark "Pluronics." The "Pluronics" are available in liquid form and in solid form, including flakes and powders. The detailed method of preparing the polymers is described in U.S. Pat. No. 2,674,619. To be particularly effective, the block polymer in each dosage unit should range from about 50 mg. to 1,000 mg. Preferably, each dosage unit ranges from 250–500 mg. The composition is preferably contained as a suspension in a filled soft elastic gelatin capsule, in a granulation filled hard-shell capsule, or in a drug granulated compressed tablet in order to facilitate oral administration. In the case of griseofulvin, an oral suspension may be prepared as well.

When the dosage of the drug substance or antibiotic is relatively high, as when tetracycline is the antibiotic in the composition, the lower portion of the preferred range of the amount of polymer is used in order to keep the size of the dosage form within relatively reasonable limits. In the case of an oral suspension, the higher portions of the range, that is, 750–1,000 mg. are used to advantage. The described compositions are always administered orally.

The following examples more clearly disclose specific embodiments of the invention.

EXAMPLE I

| Tetracycline HCl Soft Gelatin Capsules | |
|---|---|
| Ingredients | mg./capsule |
| Tetracycline HCl | 250 |
| Polyoxypropylene (M.W. 2050) polyoxyethylene (20%) Liquid Polymer | 268 |
| Polyoxypropylene (M.W. 2250) polyoxyethylene (40%) Semi-Liquid Polymer | 5 |
| Propylene Glycol | 15 |

The drug (tetracycline HCl) is dispersed in the polymers and propylene glycol and encapsulated in a soft gelatin capsule.

EXAMPLE II

| Tetracycline HCl Dry-filled Hard Shell Capsules | |
|---|---|
| Ingredients | mg./capsule |
| Tetracycline HCl | 250 |
| Polyoxypropylene (M.W. 2050) | |

EXAMPLE II-Continued

Tetracycline HCl Dry-filled Hard Shell Capsules

| Ingredients | mg./capsule |
| --- | --- |
| polyoxyethylene (70%) Solid Polymer | 250 |
| Sucrose powdered | 75 |
| Starch | 45 |
| Cab-O-Sil | 16 |
| Stearic Acid | 9 |

Sucrose and polyoxypropylene-polyoxyethylene are mixed and melted on a steam bath before the drug is added. The wetted mass is mixed thoroughly, then flaked. The flaked mass is granulated and passed through a number 20 U.S. Standard Mesh Screen into a blender. Here the granules are mixed with starch, Cab-O-Sil and stearic acid, passed through a No. 60 U.S. Standard Mesh Screen. The resultant granulation is filled into a No. 0 hard gelatin capsule.

EXAMPLE III

Tetracycline HCl Compressed Tablets

| Ingredients | mg./capsule |
| --- | --- |
| Tetracycline HCl | 250 |
| Polyoxypropylene (M.W. 2050) | |
| polyoxyethylene (70%) Solid Polymer | 250 |
| Sucrose, powdered | 75 |
| Starch | 45 |
| Cab-O-Sil | 16 |
| Stearic Acid | 9 |

A granulation is prepared as described in EXAMPLE II and compressed into tablets. These tablets may be either sugar-coated or film-coated. The film-coated tablet is preferred.

EXAMPLE IV

Chloramphenicol Soft Gelatin Capsules

| Ingredients | mg./capsule |
| --- | --- |
| Chloramphenicol | 250 |
| Polyoxypropylene (M.W. 2750) | |
| polyoxyethylene (20%) Liquid Polymer | 100 |
| Polyoxypropylene (M.W. 1750) | |
| polyoxyethylene (10%) Liquid Polymer | 170 |
| Propylene Glycol | 30 |

The drug is dispersed in the polymers and propylene glycol and encapsulated in a soft gelatin capsule.

EXAMPLE V

Griseofulvin Soft Gelatin Capsules

| Ingredients | mg./capsule |
| --- | --- |
| Griseofulvin | 250 |
| Polyoxypropylene (M.W. 1200) | |
| polyoxyethylene (20%) Liquid Polymer | 500 |
| Polyoxypropylene (M.W. 2250) | |
| polyoxyethylene (50%) Semi Solid Polymer | 20 |
| Propylene Glycol | 30 |

The drug is dispersed in the polymers and propylene glycol and encapsulated in a soft gelatin capsule.

EXAMPLE VI

The composition made in accordance with Example I was administered to dogs to determine the difference in the absorption rates between capsules made in accordance with the invention and a commercial antibiotic (tetracycline HCl 250 mg., J. B. Roerig) not made in accordance with the invention. It was found that after approximately 1½ hours to 2 hours, the micrograms of tetracycline per milliliter of blood serum dropped noticeably with the commercial antibiotic. The blood level of the tetracycline in dogs treated with the composition made in accordance with Example I remained relatively high. Up to 6 hours after the capsules were administered, the blood level for tetracycline administered in the composition of Example I, when compared with the control commercial dose, was substantially higher throughout the 6 hour observation period. The data has shown an increase of 31 percent in the absorption of the tetracycline in the blood over a 6 hour period as compared to the commercial tetracycline capsule.

EXAMPLE VII

A cross-over serum level study with eight human subjects (normal, healthy males) was undertaken employing soft elastic gelatin capsules made in accordance with Example I and a commercial antibiotic (tetracycline HCl 250 mg., J. B. Roerig) capsule as the control. Each subject received one 250 mg. capsule at least 1 hour after breakfast and 1 week later received the alternate capsule. Blood samples were withdrawn into sterile, 7 cc. "Vacutainers" at 0, 1, 2, 3, and 6 hours after the ingestion of the drug. The blood samples were stored in refrigerator overnight. All samples from 1 day's testing were assayed on the following day at the same time.

At first, the blood samples were assayed by a fluorometric and a microbiological method. The data indicated a linear correlation between the two methods. Since the fluorometric assay is more accurate than the microbiological method, the fluorometric procedure was used alone in completing the study. The results are tabulated in Tables I and II. The blood level of tetracycline in human subjects treated with the soft elastic gelatin capsule composition made in accordance with Example I remained significantly higher than the control. The data has shown an increase of 29 percent in the absorption of the tetracycline in the blood over a 6 hour period as compared to the commercial tetracycline capsule.

On the average, the increase in absorption from the composition made in accordance with Examine I is significant as compared to the absorption from the control capsule (tetracycline HCl, 250 mg., J. B. Roerig) as shown by this cross-over study which takes into account individual variations.

TABLE I

Tetracycline HCl Serum Level In mcg./ml. For A Cross-Over G.I. Absorption Study In Eight Humans With Capsule Made As Example I

| Subject | Hours After Ingestion of Drug | | | |
| --- | --- | --- | --- | --- |
| | 1 hr. mcg./ml. | 2 hr. mcg./ml. | 3 hr. mcg./ml. | 6 hr. mcg./ml. |
| 1 | 1.78 | 2.44 | 2.15 | 1.41 |
| 2 | 0.77 | 1.24 | 1.04 | 0.80 |
| 3 | 1.50 | 1.38 | 1.20 | 0.86 |
| 4 | 1.35 | 1.25 | 1.08 | 0.72 |
| 5 | 1.07 | 1.93 | 2.00 | 1.31 |
| 6 | 1.33 | 1.92 | 1.75 | 1.21 |
| 7 | 1.14 | 1.70 | 1.57 | 1.78 |
| 8 | 0.74 | 0.54 | 0.46 | 0.30 |
| Average | 1.21 | 1.55 | 1.41 | 1.05 |
| Standard Deviation | ±0.11 | ±0.57 | ±0.56 | ±0.12 |

TABLE II

Tetracycline HCl Serum Level In mcg./ml. For A Cross-Over G.I. Absorption Study In Eight Humans with Control Capsule (Tetracyn)

| Subject | Hours After Ingestion of Drug | | | |
|---|---|---|---|---|
| | 1 hr. mcg./ml. | 2 hr. mcg./ml. | 3 hr. mcg./ml. | 6 hr. mcg./ml. |
| 1 | 1.24 | 1.68 | 1.31 | 0.98 |
| 2 | 0.51 | 0.49 | 0.42 | 0.27 |
| 3 | 0.96 | 1.43 | 1.77 | 1.42 |
| 4 | 1.03 | 1.30 | 1.16 | 0.86 |
| 5 | 0.48 | 1.20 | 1.43 | 1.01 |
| 6 | 0.18 | 1.10 | 1.08 | 0.68 |
| 7 | 0.79 | 1.36 | 1.47 | 1.06 |
| 8 | 0.09 | 0.80 | 1.25 | 0.75 |
| Average | 0.66 | 1.17 | 1.24 | 0.88 |
| Standard Deviation | ±0.13 | ±0.30 | ±0.12 | ±0.11 |

EXAMPLE VIII

Chlorothiazide Soft Gelatin Capsules

| Ingredients | mg./capsule |
|---|---|
| Chlorothiazide | 250 |
| Polyoxypropylene (M.W. 2050) polyoxyethylene (20%) Liquid Polymer | 270 |
| Propylene Glycol | 40 |
| Polysorbate 80 | 30 |
| Polyoxypropylene (M.W. 2250) polyoxyethylene (50%) Semi-Solid Polymer | 10 |

The drug is dispersed in the polymers, polysorbate 80 and propylene glycol and encapsulated in a soft gelatin capsule.

EXAMPLE IX

Salicylamide Soft Gelatin Capsules

| Ingredients | mg./capsule |
|---|---|
| Salicylamide | 300 |
| Polyoxypropylene (M.W. 2050) polyoxyethylene (20%) Liquid Polymer | 235 |
| Polysorbate 80 | 25 |
| Propylene Glycol | 40 |

The drug is dispersed in the polymer, polysorbate 80 and propylene glycol and encapsulated in a soft gelatin capsule.

EXAMPLE X

Chlorpropamide Soft Gelatin Capsules

| Ingredients | mg./capsule |
|---|---|
| Chlorpropamide | 100 |
| Polyoxypropylene (M.W. 2050) polyoxyethylene (20%) Liquid Polymer | 325 |
| Propylene Glycol | 25 |

The drug is dispersed in the polymer and propylene glycol and encapsulated in a soft gelatin capsule.

EXAMPLE XI

Phenylbutazone Soft Gelatin Capsules

| Ingredients | mg./capsule |
|---|---|
| Phenylbutazone | 100 |
| Polyoxypropylene (M.W. 2050) polyoxyethylene (20%) Liquid Polymer | 325 |
| Propylene Glycol | 25 |

The drug is dispersed in the polymer and propylene glycol and encapsulated in a soft gelatin capsule.

EXAMPLE XII

Propylthiouracil Soft Gelatin Capsules

| Ingredients | mg./capsule |
|---|---|
| Propylthiouracil | 50 |
| Polyoxypropylene (M.W. 1750) polyoxyethylene (40%) Liquid Polymer | 190 |

The drug is dispersed in the polymer and encapsulated in a soft gelatin capsule.

EXAMPLE XIII

Sulfadiazine Soft Gelatin Capsules

| Ingredients | mg./capsule |
|---|---|
| Sulfadiazine | 500 |
| Polyoxypropylene (M.W. 2050) polyoxyethylene (20%) Liquid Polymer | 620 |
| Propylene Glycol | 60 |

The drug is dispersed in the polymer and propylene glycol and encapsulated in a soft gelatin capsule.

EXAMPLE XIV

Sulfacetamide Soft Gelatin Capsules

| Ingredients | mg./capsule |
|---|---|
| Sulfacetamide | 500 |
| Polyoxypropylene (M.W. 1200) polyoxyethylene (20%) Liquid Polymer | 105 |
| Polysorbate 80 | 15 |
| Propylene Glycol | 30 |
| Polyethylene Glycol 400 | 400 |

The ingredients in the formulation are mixed well. The resulting suspension is encapsulated in a soft gelatin capsule.

EXAMPLE XV

Dienestrol Soft Gelatin Capsules

| Ingredients | mg./capsule |
|---|---|
| Dienestrol | 0.5 |
| Polyoxypropylene (M.W. 2050) Polyoxyethylene (20%) Liquid Polymer | 190.0 |
| Propylene Glycol | 9.5 |

The drug, dienestrol, is dissolved in the polymer and propylene glycol and encapsulated in a soft gelatin capsule.

EXAMPLE XVI

Methyltestosterone Soft Gelatin Capsules

| Ingredients | mg./capsule |
|---|---|
| Methyltestosterone | 10 |
| Polyoxypropylene (M.W. 1750) polyoxyethylene (10%) Liquid Polymer | 103 |
| Polyoxypropylene (M.W. 2250) polyoxyethylene (50%) Semi-Liquid Polymer | 87 |

The drug, methyltestosterone, is dispersed in the polymers. The resulting suspension is encapsulated in a soft gelatin capsule.

EXAMPLE XVII

Two normal healthy dogs of the Beagle strain that had been acclimated to laboratory conditions were used. The animals had been deparasitized, vaccinated and consumed their daily ration of Purina Chow with water allowed ad libitum. Both animals were fasted for eighteen hours before dosing. Comparisons were made between poloxamer system (sample No. 1) and a system containing a surfactant (sample No. 3). Sample No. 1 had the following formulation:

| | |
|---|---|
| Ba SO$_4$ for X-ray | 545 g |
| Polyoxypropylene (M.W. 2050) Polyoxyethylene 20% Liquid Polymer Sp. Gravity 1.71 | 490 g |
| Ba SO$_4$ | 900 mg/cc |

Sample No. 3 had the following formulation:

| | |
|---|---|
| Ba SO$_4$ for X-ray | 575 g |
| Polysorbate 80 Sp. Gravity 1.75 | 490 g |
| Ba SO$_4$ | 945 mg/cc |

On the test day, one dog received 30 ml of Sample No. 1, and the other dog received 30 ml of Sample No. 3. The test suspensions were placed directly into the stomach of each animal by stomach tube.

X-rays were taken of the gastrointestinal tract at zero hours (pre-dosing) and at ½, 1, 1½, 2 and 4 hours past dosing.

One week later the study was repeated with each animal receiving the other suspension. X-rays were taken at the same time intervals as performed initially.

In each case, Sample No. 3 left the stomach between ½ and 1 hour. In contrast, Sample No. 1 did not leave the stomach after 4 hours.

EXAMPLE XVIII

A cross-over serum level study with eight human subjects (normal, healthy males) was undertaken employing soft elastic gelatin capsules made in accordance with Example V and a commercial antifungal (Grisactin 250 mg., Ayerst) capsules as the control. Each subject received one 250 mg. capsule at least one hour after breakfast and one week later received the alternate capsule. Blood samples were withdrawn into sterile, 7 cc "Vacutainers" at 0, 1, 2, 4, 6, 8, 12 and 24 hours after the ingestion of the drug. The blood samples were stored in refrigerator until analysis. All samples from 1 day's testing were assayed on the following date at the same time. The 24 hour sample was analyzed on the same day.

The blood samples were assayed by a modified, fluorometric procedure of Fischer and Riegelman [J. Pharm. Sci., 54, 1571 (1965)], which in turn is an adaptation of the method described by Bedford et al. [Nature, 184, 364 (1959)]. The results are tabulated in Tables III and IV. The blood level of griseofulvin in the human subjects treated with the soft elastic gelatin capsule composition made in accordance with Example V remained significantly higher than the control. The data has shown an increase of 33 percent in the absorption of the griseofulvin in the blood over a 12 hour period as compared to the commercial griseofulvin capsule.

The absolute standard deviations given in Tables III and IV may seem high at first as the values range from 0.11 to 0.43 mcg/ml. However, some typical data taken from the literature [S. Symchowicz and B. Katchen, J. Pharm. Sci., 57, 1383 (1968)], and listed in Table V show absolute standard deviations range from 0.18 to 0.53 mcg/ml. It can be seen that the standard deviations in Tables III and IV fall in the range of those in Table V. A surprising observation is the similarity of the data in Tables IV and V, although the values in Table V are from 500 mg. doses of griseofulvin as compared to 250 mg. for the values in Table IV.

TABLE III

Griseofulvin Serum Level In mcg./ml. For A Cross-Over G.I. Absorption Study In Eight Humans with Control Capsule (Grisactin)

| Subject | Hours After Ingestion of Drug | | | | | | |
|---|---|---|---|---|---|---|---|
| | 1 hr. mcg/ml. | 2 hr. mcg/ml. | 4 hr. mcg/ml. | 6 hr. mcg/ml. | 8 hr. mcg/ml. | 12 hr. mcg/ml. | 24 hr. mcg/ml. |
| 1 | 0.162 | 0.713 | 0.823 | 0.787 | 0.730 | | |
| 2 | 0.410 | 0.574 | 0.483 | 0.445 | 0.465 | | |
| 3 | 0.796 | 0.554 | 0.699 | 0.654 | 0.711 | | |
| 4 | 0.259 | 0.529 | 1.054 | 0.854 | 0.756 | | |
| 5 | 0.354 | 0.544 | 0.450 | 0.470 | 0.453 | 0.452 | 0.473 |
| 6 | 0.116 | 0.497 | 0.557 | 0.527 | 0.421 | 0.453 | 0.434 |
| 7 | 0.459 | 0.642 | 0.538 | 0.537 | 0.527 | 0.452 | 0.374 |
| 8 | 0.000 | 0.358 | 1.169 | 1.111 | 1.092 | 0.977 | 0.785 |
| Average | 0.320 | 0.551 | 0.722 | 0.673 | 0.644 | 0.584 | 0.517 |
| Std. Deviation | ±0.247 | ±0.108 | ±0.271 | ±0.230 | ±0.226 | ±0.262 | ±0.184 |

TABLE IV

Griseofulvin Serum Level In mcg./ml. For A Cross-Over G.I. Absorption Study In Eight Humans With Capsule Made In Accordance With Example V

| Subject | Hours After Ingestion of Drug | | | | | | |
|---|---|---|---|---|---|---|---|
| | 1 hr. mcg/ml. | 2 hr. mcg/ml. | 4 hr. mcg/ml. | 6 hr. mcg/ml. | 8 hr. mcg/ml. | 12 hr. mcg/ml. | 24 hr. mcg/ml. |
| 1 | 0.542 | 0.817 | 0.695 | 0.633 | 0.599 | | |
| 2 | 0.054 | 0.515 | 0.959 | 1.012 | 1.074 | | |
| 3 | 0.542 | 1.391 | 1.455 | 1.369 | 0.928 | | |
| 4 | 0.515 | 0.624 | 0.674 | 0.662 | 1.073 | | |
| 5 | 0.612 | 0.858 | 0.774 | 0.797 | 0.817 | 0.645 | 0.549 |
| 6 | 0.000 | 0.043 | 1.036 | 1.246 | 1.186 | 0.959 | 0.755 |

TABLE IV—Continued

Griseofulvin Serum Level In mcg./ml. For A Cross-Over
G.I. Absorption Study In Eight Humans With Capsule
Made In Accordance With Example V

| Subject | Hours After Ingestion of Drug | | | | | | |
|---|---|---|---|---|---|---|---|
| | 1 hr. mcg/ml. | 2 hr. mcg/ml. | 4 hr. mcg/ml. | 6 hr. mcg/ml. | 8 hr. mcg/ml. | 12 hr. mcg/ml. | 24 hr. mcg/ml. |
| 7 | 0.000 | 0.110 | 1.024 | 0.875 | 0.855 | 0.671 | 0.571 |
| 8 | 0.185 | 0.602 | 0.908 | 0.798 | 0.805 | 0.607 | 0.453 |
| Average | 0.306 | 0.620 | 0.941 | 0.924 | 0.917 | 0.721 | 0.582 |
| Std. Deviation | ±0.271 | ±0.429 | ±0.251 | ±0.240 | ±0.188 | ±0.161 | ±0.126 |

TABLE V

Data Obtained From Symchowicz and Katchen For A Cross-Over
Serum Level Study In Eight Normal Humans Following The Oral
Administration Of 500 mg. Of Griseofulvin Tablet

| Subject | Hours After Ingestion of Drug | | | |
|---|---|---|---|---|
| | 2 hr. mcg/ml. | 4 hr. mcg/ml. | 8 hr. mcg/ml. | 25 hr. mcg/ml. |
| 1 | 0.72 | 0.82 | 0.64 | 0.78 |
| 2 | 1.07 | 1.08 | 0.94 | 0.62 |
| 3 | 0.29 | 1.62 | 2.20 | 0.58 |
| 4 | 0.82 | 1.13 | 0.58 | 0.85 |
| 5 | 0.43 | 0.59 | 0.60 | 0.65 |
| 6 | 1.49 | 1.58 | 0.86 | 0.59 |
| 7 | 0.29 | 0.53 | 0.77 | 1.00 |
| 8 | 0.75 | 0.83 | 0.80 | 1.03 |
| Average | 0.73 | 1.02 | 0.92 | 0.76 |
| Std. Deviation | ±0.41 | ±0.41 | ±0.53 | ±0.18 |

TABLE VI

Chloramphenicol Serum Level In mcg/ml For A Cross-Over
G.I. Absorption Study in Eight * Humans With
Test Capsule (250 mg./capsule)

| Subject | Hours After Ingestion of Drug | | | | |
|---|---|---|---|---|---|
| | 1 hr. mcg/ml. | 2 hr. mcg/ml. | 4 hr. mcg/ml. | 6 hr. mcg/ml. | 8 hr. mcg/ml. |
| 1 | 4.4 | 4.2 | 1.9 | 1.1 | 0.9 |
| 2 | 4.7 | 3.1 | 2.3 | 1.7 | 1.3 |
| 3 | 0.4 | 4.9 | 2.8 | 2.1 | 1.8 |
| 4 | 3.3 | 4.4 | 3.5 | 2.8 | 2.2 |
| 5 | 4.5 | 3.6 | 1.9 | 1.1 | 0.8 |
| 6 | 6.3 | 4.2 | 2.0 | 3.2 | 1.7 |
| 7 | 2.5 | 3.8 | 3.4 | 2.7 | 1.8 |
| Average | 3.7 | 4.0 | 2.5 | 2.1 | 1.7 |
| Std. Deviation | ±1.9 | ±0.6 | ±0.7 | ±0.8 | ±0.6 |

* One subject withdrew from test before final cross-over was completed.

EXAMPLE XIX

A cross-over serum level study with eight human subjects (normal, healthy males) was undertaken employing soft elastic gelatin capsules made in accordance with Example IV and a commercial antibiotic (Chloromycetin 250 mg/cap., Parke-Davis) capsules as the control. Each subject received one 250 mg. capsule at least 1 hour after breakfast and 1 week later received the alternate capsule. Blood samples were withdrawn into sterile, 7 cc. "Vacutainers" at 0, 1, 2, 4, 6 and 8 hours after the ingestion of the drug. The blood samples were stored in refrigerator until analysis. All samples from one day's testing were assayed on the following day at the same time.

The blood samples were assayed by a modified procedure described by Glazko [A. J. Glazko, G. L. Hobby, editor: Antimicrobial Agents and Chemotherapy - 1966, Ann Arbor 1967, Am. Soc. of Microbiology, pp. 655–665.] The results are tabulated in Tables VI and VII. The blood level of chloramphenicol in the human subjects treated with the soft elastic gelatin capsule composition made in accordance with Example IV remained significantly higher than the control. The data has shown an increase of 17.4 percent in the absorption of chloramphenicol in the blood over an 8 hour period as compared to the commercial chloramphenicol capsule.

Table VI contains data for seven human subjects because one person withdrew from the test just before the final cross-over was completed. The absolute standard deviations given in Table VI are comparable to those in Table VII. In general, the standard deviations are high, thus there are considerable individual variations in absorption. However, the 17.4 percent increase in absorption from the composition made in accordance with Example IV is significant as compared to the absorption from the control capsule (Chloromycetin, 250 mg. Parke-Davis) because this cross-over study takes into account individual variations.

TABLE VII

Chloramphenicol Serum Level In mcg/ml. For A Cross-Over G.I.
Absorption Study In Eight Humans With Control Capsule
(Chloromycetin, Parke-Davis 250 mg/capsule)

| Subject | Hours After Ingestion of Drug | | | | |
|---|---|---|---|---|---|
| | 1 hr. mcg/ml. | 2 hr. mcg/ml. | 4 hr. mcg/ml. | 6 hr. mcg/ml. | 8 hr. mcg/ml. |
| 1 | 4.6 | 3.1 | 1.7 | 1.0 | 0.6 |
| 2 | 3.8 | 3.0 | 1.2 | 1.0 | 0.6 |
| 3 | 1.1 | 2.8 | 2.3 | 2.5 | 1.6 |
| 4 | 4.9 | 3.8 | 2.8 | 1.8 | 1.4 |
| 5 | 1.6 | 2.7 | 4.3 | 2.8 | 2.1 |
| 6 | 2.4 | 3.6 | 3.1 | 2.3 | 1.7 |
| 7 | 2.8 | 5.8 | 3.2 | 1.9 | 1.2 |
| 8 | 4.5 | 3.3 | 1.7 | 0.8 | 0.3 |
| Average | 3.2 | 3.5 | 2.5 | 1.8 | 1.2 |
| Std. Deviation | ±1.5 | ±1.0 | ±1.0 | ±0.8 | ±0.6 |

EXAMPLE XX

A cross-over serum level study with 4 human subjects (normal, healthy males) was undertaken employing soft elastic gelatin capsules made in accordance with Example XI and a commercial, nonsteroid, anti-inflammatory agent (Butazolidin, 100 mg/tablet, Geigy) tablet as the control. Each subject received one 100 mg. capsule or tablet at least 1 hour after breakfast and 2 weeks later received the alternate dose. Blood samples were withdrawn into sterile 7 cc. "Vacutainers" at 0, 1, 2, 4, 8 and 24 hours after the ingestion of the drug. The blood samples were stored in refrigerator until analysis. All samples from one day's testing were assayed on the following day at the same time. The 24 hour sample was analyzed on the same day.

The blood samples were assayed by a modified method, described by Burns et al. [J. Pharmacol, Exp.

Ther., 109, 346 (1953)π The results are tabulated in Tables VIII and IX. The blood level of phenylbutazone in the human subjects treated with the soft elastic gelatin capsule composition made in accordance with Example XI remained significantly higher than the control. The data reflects an increase of 186 percent in the absorption of phenylbutazone in the blood over an 8 hour period as compared to the commercial phenylbutazone tablet.

At first, the 186 percent seemed like a remarkable increase in absorption. However, this increment correlates well with data from in vitro dissolution studies. The in vitro dissolution rates indicated the test capsule released the phenylbutazone quickly and completely. The Butazolidin tablet released phenylbutazone diminishingly slow, the resulting concentration is not conducive to absorption into the body as shown by the low level in the blood serum. The test capsule apparently facilitated the absorption process by the quick release and the increase in the dwell time of the drug in the upper portion of the gastrointestinal tract where absorption takes place mainly.

TABLE VIII

Phenylbutazone Serum Level In mcg/ml. For A Cross-Over G.I. Absorption Study In Four Humans With Test Capsule (100 mg./capsule)

| Subject | Hours After Ingestion of Drug | | | | |
|---|---|---|---|---|---|
| | 1 hr. mcg/ml. | 2 hr. mcg/ml. | 4 hr. mcg/ml. | 8 hr. mcg/ml. | 24 hr. mcg/ml. |
| 1 | 9.6 | 18.3 | 16.4 | 12.5 | 9.9 |
| 2 | 15.9 | 15.4 | 12.8 | 11.9 | 9.2 |
| 3 | 16.9 | 17.1 | 11.1 | 10.6 | 8.6 |
| 4 | 18.9 | 17.1 | 14.8 | 12.2 | 9.5 |
| Average | 15.3 | 17.0 | 13.8 | 11.8 | 9.3 |
| Std. Deviation | ±4.0 | ±1.2 | ±2.3 | ±0.8 | ±0.2 |

TABLE IX

Phenylbutazone Serum Level In mcg/ml. For A Cross-Over Gastrointestinal Absorption Study In Four Humans With Control Tablet (Butazolidin, 100 mg/tablet, Geigy)

| Subject | Hours After Ingestion of Drug | | | | |
|---|---|---|---|---|---|
| | 1 hr. mcg/ml. | 2 hr. mcg/ml. | 4 hr. mcg/ml. | 8 hr. mcg/ml. | 24 hr. mcg/ml. |
| 1 | 0.0 | 0.0 | 3.9 | 6.4 | 6.2 |
| 2 | 0.0 | 1.9 | 8.0 | 8.3 | 5.5 |
| 3 | 2.5 | 5.6 | 6.3 | 6.5 | 7.5 |
| 4 | 0.0 | 0.3 | 4.1 | 10.0 | 8.2 |
| Average | 0.6 | 2.0 | 5.6 | 7.8 | 6.9 |
| Std. Deviation | ±1.2 | ±2.5 | ±1.9 | ±1.7 | ±1.2 |

EXAMPLE XXI

A cross-over blood serum level experiment with four human subjects (normal, healthy males) was undertaken using soft elastic gelatin capsules and a commercial, non-steroid, anti-inflammatory agent tablet (Butazolidin, 100 mg./tablet, Geigy) as the control. The soft elastic gelatin test capsule was made by encapsulating a suspension of 100 mg phenylbutazone in 100 mg. of polysorbate 80 along with 90 mg. PEG 400 per capsule. Each human subject received one capsule or tablet at least one hour after breakfast and two weeks later received the alternate dose. Blood samples were withdrawn into sterile, 7 cc. "Vacutainers" at 0, 1, 2, 4, 8, and 24 hours after the ingestion of the drug. The blood samples were stored in a refrigerator until analysis. All samples from 1 day's testing were assayed on the following day at the same time. The 24 hour sample was analyzed on the same day.

The blood samples were assayed by a modified method, described by Burns et al. [J. Pharmacol. Exp. Ther., 109, 346 (1953)]. The results are tabulated in Tables X and XI. The blood level of phenylbutazone in the human subjects treated with the soft elastic gelatin test capsule remained higher than the control tablet. The data indicated however, that the absorption of phenylbutazone from the polysorbate 80 base was 100 percent greater than the control tablets. Referring to Example XX, the enhanced absorption of phenylbutazone made with the polyoxypropylene polyoxyethylene block polymers represented a 186 percent increase as compared to the same control tablets.

The data indicate that the control tablet is a poor dosage form and that the absorption of phenylbutazone cannot be affected positively by the mere use of an efficient surface-active agent. In addition, the data demonstrate that the delayed transit provided by the polyoxypropylene polyoxyethylene block polymers is a real phenomenon and is not dependent on surface activity alone.

TABLE X

Phenylbutazone Serum Level In mcg/ml. For A Cross-Over Gastrointestinal Absorption Study In Four Humans With Test Capsule (100 mg/Capsule)

| Subject | Hours After Ingestion of Drug | | | | |
|---|---|---|---|---|---|
| | 1 hr. mcg/ml. | 2 hr. mcg/ml. | 4 hr. mcg/ml. | 8 hr. mcg/ml. | 24 hr. mcg/ml. |
| 1 | 18.1 | 17.4 | 12.5 | 13.3 | 9.4 |
| 2 | 14.5 | 16.4 | 13.0 | 12.0 | 8.6 |
| 3 | 14.8 | 10.8 | 11.5 | 12.2 | 7.6 |
| 4 | 6.9 | 13.6 | 15.1 | 13.3 | 8.8 |
| Average | 13.6 | 14.6 | 13.0 | 12.7 | 8.6 |
| Std. Deviation | ±4.7 | ±3.0 | ±1.5 | ±0.7 | ±0.8 |

TABLE XI

Phenylbutazone Serum Level In mcg/ml. For A Cross-Over Gastrointestinal Absorption Study In Four Humans With Control Tablet (Butazolidin, 100 mg/tablet, Geigy)

| Subject | Hours After Ingestion of Drug | | | | |
|---|---|---|---|---|---|
| | 1 hr. mcg/ml. | 2 hr. mcg/ml. | 4 hr. mcg/ml. | 8 hr. mcg/ml. | 24 hr. mcg/ml. |
| 1 | 1.6 | 3.3 | 4.5 | 5.1 | 4.0 |
| 2 | 2.3 | 8.4 | 8.8 | 10.0 | 7.7 |
| 3 | 1.7 | 3.4 | 8.8 | 7.2 | 8.3 |
| 4 | 0.1 | 5.7 | 11.1 | 8.0 | 5.3 |
| Average | 1.4 | 5.2 | 8.3 | 7.6 | 6.3 |
| Std. Deviation | ±0.9 | ±2.4 | ±2.8 | ±2.0 | ±2.0 |

EXAMPLE XXII

A cross-over blood serum level experiment with four human subjects (normal, healthy males) was undertaken employing soft elastic gelatin capsules and a commercial antibiotic capsule (Tetracyn, 250 mg/capsule, Roerig) as the control. A soft elastic gelatin test capsule was made by encapsulating a suspension of 250 mg. tetracycline HCl in 300 mg. Polysorbate 80 per capsule. Each human subject received one 250 mg. capsule at least one hour after breakfast and one week later received the alternate capsule. Blood samples were withdrawn into sterile, 7 cc "Vacutainers" at 0, 1, 2, 3 and 6 hours after the ingestion of the drug. The blood samples were stored in refrigerator until analysis. All samples from 1 day's testing were assayed on the following day at the same time.

The blood samples were assayed by a fluorometric procedure as reported by Kohn [Anal. Chem., 33, 862 (1961)]. The results are tabulated in Tables XII and XIII. The blood level of tetracycline HCl in the human subjects treated with the soft elastic gelatin test capsule remained significantly lower than the control. The data indicated that the absorption of tetracycline HCl from polysorbate 80 was 73 percent of that of the control capsules.

The results of the present study show that the presence of a surfactant in a formulation is no assurance of better drug absorption. Further, it demonstrates that the delayed gastrointestinal transport realized with the polyoxypropylene-polyoxyethylene block polymer base capsules is responsible for the enhanced absorption rather than mere surface activity.

TABLE XII

Tetracycline HCl Serum Level In mcg/ml For A Cross-Over G.I. Absorption Study In Four Humans With Test Capsule (250 mg/capsule with Polysorbate 80)

| Subject | Hours After Ingestion of Drug | | | |
| --- | --- | --- | --- | --- |
| | 1 hr. mcg/ml. | 2 hr. mcg/ml. | 3 hr. mcg/ml. | 6 hr. mcg/ml. |
| 1 | 1.57 | 2.22 | 1.75 | 1.27 |
| 2 | 1.13 | 1.91 | 1.80 | 1.10 |
| 3 | 0.11 | 1.27 | 0.53 | 1.02 |
| 4 | 0.08 | 0.69 | 0.59 | 0.33 |
| Average | 0.72 | 1.27 | 1.17 | 0.93 |
| Std. Deviation | ±0.75 | ±0.94 | ±0.71 | ±0.41 |

TABLE XIII

Tetracycline HCl Serum Level In mcg/ml For A Cross-Over G. I. Absorption Study In Four Humans With Control Capsule (Tetracyn, 250 mg/capsule, Roerig)

| Subject | Hours After Ingestion of Drug | | | |
| --- | --- | --- | --- | --- |
| | 1 hr. mcg/ml. | 2 hr. mcg/ml. | 3 hr. mcg/ml. | 6 hr. mcg/ml. |
| 1 | 0.03 | 0.20 | 0.54 | 0.38 |
| 2 | 1.46 | 1.36 | 1.25 | 0.87 |
| 3 | 1.55 | 2.12 | 2.26 | 1.41 |
| 4 | 0.93 | 1.90 | 2.23 | 1.89 |
| Average | 1.10 | 1.40 | 1.57 | 1.14 |
| Std. Deviation | ±0.71 | ±0.86 | ±0.58 | ±0.65 |

EXAMPLE XXIII

A cross-over serum level study with eight human subjects (normal, healthy males) was undertaken employing tablets made in accordance with the following formulation:

GRISEOFULVIN COMPRESSED TABLETS, ET-1

| Ingredients | mg./tablet |
| --- | --- |
| Griseofulvin | 250 |
| Polyoxypropylene (M.W. 2050) polyoxyethylene (70%) Solid Polymer | 250 |
| Sucrose, Powder | 75 |
| Starch | 60 |
| Cab-O-Sil | 20 |
| Solka Floc | 16 |
| Stearic Acid | 9 |

A commercial antifungal capsule (Grisactin, 250 mg/capsule, Ayerst) was the control. Each subject received one 250 mg. tablet or capsule at least 1 hour after breakfast and 1 week later received the alternate dose. Blood samples were withdrawn into sterile, 7 cc "Vacutainers" at 0, 1, 2, 4, 6, 7, 12 and 24 hours after the ingestion of the drug. The blood samples were stored in refrigerator until analysis. All samples from 1 day's testing were assayed on the following day at the same time. The 24 hour samples were analyzed on the same day.

The blood samples were assayed by a modified fluorometric procedure described by Fischer and Riegelman [J. Pharm. Sci., 54, 1571 (1965)]. Results are tabulated in Tables XIV and XV. The blood levels of griseofulvin in the human subjects treated with the tablets containing an equal weight of the polyoxypropylene polyoxyethylene solid polymer were significantly higher than the control. There was an increase of 57 percent in the absorption of griseofulvin in the blood over a twelve hour period as compared to the commercial griseofulvin capsule.

The results from the present study further show that the presence of the polyoxypropylene polyoxyethylene block polymer in a pharmaceutical formulation significantly increases the blood level of the active ingredient. Although the test tablet contains only 250 mg. griseofulvin it gave rise to a blood level higher than that from a 500 mg. tablet as reported by Symchowicz and Katchen [J. Pharm. Sci., 57, 1383 (1968)], as listed in Table V. For example, after four hours, the test tablet elicited a blood level of 1.22 mcg./ml. as compared to 1.02 mcg./ml. from the 500 mg. tablet. The test tablet gave even a higher blood level than the capsule made in accordance with Example V. The difference between the liquid polymer used in the Example V capsule and the solid polymer in the test tablet is the higher content of the polyoxyethylene moiety in the latter polymer.

TABLE XIV

Griseofulvin Serum Level In mcg/ml. For A Cross-Over G.I. Absorption Study In Eight Humans With Test Tablet

| Subject | Hours After Ingestion of Drug | | | | | | |
|---|---|---|---|---|---|---|---|
| | 1 hr. mcg/ml. | 2 hr. mcg/ml. | 4 hr. mcg/ml. | 6 hr. mcg/ml. | 8 hr. mcg/ml. | 12 hr. mcg/ml. | 24 hr. mcg/ml. |
| 1 | 0.50 | 1.29 | 1.27 | 1.25 | 1.06 | 0.89 | 0.40 |
| 2 | 0.00 | 1.05 | 1.21 | 1.85 | 1.98 | 1.37 | 0.27 |
| 3 | 0.96 | 1.45 | 1.29 | 0.97 | 0.90 | 0.83 | 0.54 |
| 4 | 0.04 | 0.47 | 0.47 | 0.50 | 0.51 | 0.33 | 0.34 |
| 5 | 0.68 | 0.97 | 0.60 | 0.60 | 0.50 | 0.36 | 0.26 |
| 6 | 1.42 | 2.13 | 1.84 | 1.33 | 1.36 | 0.96 | 0.49 |
| 7 | 2.22 | 1.20 | 1.12 | 0.93 | 0.84 | 0.79 | 0.45 |
| 8 | 0.39 | 1.40 | 1.72 | 1.66 | 2.21 | 1.82 | 0.32 |
| Average | 0.78 | 1.25 | 1.19 | 1.14 | 1.17 | 0.92 | 0.38 |
| Std. Deviation | ±0.75 | ±0.47 | ±0.48 | ±0.48 | ±0.63 | ±0.49 | ±0.33 |

TABLE XV

Griseofulvin Serum Level In mcg/ml. For A Cross-Over G.I. Absorption Study In Eight Humans With Control Capsule (Grisactin)

| Subject | Hours After Ingestion of Drug | | | | | | |
|---|---|---|---|---|---|---|---|
| | 1 hr. mcg/ml. | 2 hr. mcg/ml. | 4 hr. mcg/ml. | 6 hr. mcg/ml. | 8 hr. mcg/ml. | 12 hr. mcg/ml. | 24 hr. mcg/ml. |
| 1 | 0.29 | 0.48 | 0.44 | 0.56 | 0.62 | 0.62 | 0.46 |
| 2 | 1.18 | 1.75 | 1.60 | 1.27 | 1.22 | 0.97 | 0.49 |
| 3 | 0.44 | 0.41 | 0.63 | 0.62 | 0.63 | 0.48 | 0.56 |
| 4 | 0.59 | 1.35 | 0.86 | 0.94 | 1.00 | 0.83 | 0.66 |
| 5 | 0.11 | 0.65 | 0.84 | 0.68 | 0.60 | 0.47 | 0.50 |
| 6 | 1.25 | 0.73 | 1.07 | 0.75 | 0.67 | 0.49 | 0.36 |
| 7 | 0.35 | 0.61 | 0.39 | 0.39 | 0.42 | 0.44 | 0.39 |
| 8 | 0.22 | 0.61 | 0.57 | 0.50 | 0.49 | 0.40 | 0.28 |
| Average | 0.55 | 0.82 | 0.80 | 0.71 | 0.71 | 0.59 | 0.46 |
| Std. Deviation | ±0.43 | ±0.47 | ±0.40 | ±0.28 | ±0.27 | ±0.21 | ±0.12 |

EXAMPLE XXIV

A cross-over study has been undertaken with two different sets of four normal, healthy, human male subjects. The gastrointestinal absorption, blood serum level and urinary excretion of salicylamide were determined following the oral ingestion of the test capsule and a commercial tablet as the control. The test capsule was made in accordance with Example IX but without the use of polysorbate 80 and propylene glycol. The commercial tablet contained 5 grains of salicylamide. The results shown below have been normalized to a 300 mg. dose of salicylamide. Each human subject received one capsule or tablet at least 1 hour after breakfast and one week later received the alternate dose. Blood samples were withdrawn into sterile, cc. cc "vacutainers" at 0, 1, 2, 3 and 6 hours after the ingestion of the drug. The blood samples were stored in a refrigerator until analysis. The urine samples were collected into bottles at 0, 1, 2, 3, 4, 5, and 7 hours. Each urine sample's volume was recorded, then the urine was stored in a refrigerator until analysis. All samples from 1 day's testing were assayed on the following day at the same time. The method published in J. Pharm. Sci., 60, 1092 (1971) was used for the determination of salicylamide in the blood and urine samples.

Results

The blood serum data are shown in Tables XVI and XVII. The blood level results show a 9 percent increase in absorption of salicylamide from the soft gelatin test capsule as compared to the control tablet. The urine data are tabulated in Tables XVIII and XIX. The urinary excretion rate of salicylamide results in a 12 percent increase from the soft gelatin test capsule as compared to the tablet control. The average recovery of salicylamide over the first seven hours was 85.1 percent of the dose from the tablet control. The higher first and second hour salicylamide serum levels achieved with the test capsule reflects early and prompt analgesic response.

TABLE XIV

Salicylamide Serum Level In mcg/ml. For A Cross-Over G.I. Absorption Study In Four Humans With Test Capsule (300 mg./capsule)

| Subject | Hours After Ingestion of Drug | | | |
|---|---|---|---|---|
| | 1 hr. mcg/ml. | 2 hr. mcg/ml. | 3 hr. mcg/ml. | 6 hr. mcg/ml. |
| 1 | 8.94 | 4.77 | 2.09 | 0.31 |
| 2 | 9.07 | 5.49 | 3.29 | 0.31 |
| 3 | 10.38 | 3.81 | 2.20 | 0.15 |
| 4 | 0.22 | 9.07 | 2.78 | 1.21 |
| Average | 7.15 | 5.79 | 2.59 | 0.50 |
| Std. Deviation | ±4.66 | ±2.29 | ±0.55 | ±0.48 |

TABLE XVII

Salicylamide Serum Level In mcg/ml. For A Cross-Over G.I. Absorption Study In Four Humans With Control Tablet (5 grains, normalized to 300 mg/tablet)

| Subject | Hours After Ingestion of Drug | | | |
|---|---|---|---|---|
| | 1 hr. mcg/ml. | 2 hr. mcg/ml. | 3 hr. mcg/ml. | 6 hr. mcg/ml. |
| 1 | 7.16 | 9.46 | 3.80 | 0.75 |
| 2 | 7.46 | 6.08 | 2.77 | 0.08 |
| 3 | 2.80 | 4.45 | 2.17 | 0.70 |
| 4 | 6.12 | 3.77 | 2.65 | 0.60 |
| Average | 5.89 | 5.94 | 2.85 | 0.53 |
| Std. Deviation | ±2.21 | ±2.54 | ±0.69 | ±0.30 |

TABLE XVIII

Salicylamide Urinary Excretion Rate in mg/hr. For A Cross-Over G. I. Absorption Study in Four Humans With Test Capsule (300 mg/capsule)

| Subject | Hours After Ingestion of Drug | | | | | |
|---|---|---|---|---|---|---|
| | 1 hr. mg/hr. | 2 hr. mg/hr. | 3 hr. mg/hr. | 4 hr. mg/hr. | 5 hr. mg/hr. | 7 hr. mg/hr. |
| 1 | 16.9 | 67.8 | 88.7 | 50.6 | 27.3 | 7.5 |
| 2 | 19.1 | 71.8 | 80.6 | 50.1 | 28.2 | 8.4 |
| 3 | 32.9 | 87.3 | 95.0 | 28.5 | 11.4 | 4.9 |
| 4 | 94.2 | 97.6 | 37.3 | 13.9 | 7.7 | 5.1 |
| Average | 40.8 | 81.1 | 75.4 | 35.8 | 18.7 | 6.5 |
| Std. Deviation | ±36.2 | ±13.8 | ±26.0 | ±17.8 | ±10.8 | ±1.7 |

TABLE XIX

Salicylamide Urinary Excretion Rate In mg/hr. For A Cross-Over G.I. Absorption Study In Four Humans With Control Tablet (5 grains, normalized to 300 mg/tablet)

| Subject | Hours After Ingestion of Drug | | | | | |
|---|---|---|---|---|---|---|
| | 1 hr. mg/hr. | 2 hr. mg/hr. | 3 hr. mg/hr. | 4 hr. mg/hr. | 5 hr. mg/hr. | 7 hr. mg/hr. |
| 1 | 9.6 | 72.0 | 59.9 | 31.1 | 14.1 | 17.6 |
| 2 | 0.0 | 19.0 | 83.6 | 76.4 | 43.4 | 18.5 |
| 3 | 111.8 91.0 | 23.1 | 10.0 | 5.9 | 3.8 | |
| 4 | 35.5 96.0 | 56.4 | 32.3 | 21.5 | 8.1 | |
| Average | 39.2 | 69.5 | 55.8 | 37.5 | 21.2 | 12.0 |
| Std. Deviation | ±50.6 | ±35.2 | ±24.8 | ±27.9 | ±15.9 | ±7.2 |

EXAMPLE XXVI

Prepared soft gelatin capsules contained 325 mg. of salicylamide and 250 mg. of one of the three test vehicles (PEG 400, Carbowax 6,000 and poloxamers). Four normal human males were used for the present study in a three by four Latin Square Design experiment. Each subject ingested the designated capsule in the morning on a fasted stomach along with 250 ml. of tap water. Urine samples were collected at 0, 1, 2, 3, 4, and 6 hours after the oral ingestion of the capsule. After recording the volumes, the urine samples were stored in a refrigerator pending analysis. The urine samples were determined for salicylamide content by the published method which appeared in J. Pharm. Sci., 60, 1092–1095 (1971).

RESULTS AND CONCLUSIONS

The individual data, their averages and standard deviations are tabulated in Table XX for the three vehicles. The standard deviations are about normal for this type of data. The average results were plotted. Both vehicles PEG 400 and Carbowax 6,000 appeared to have slightly faster rate at the 2 hour mark. However, the poloxamers have a more prolonged effect. This extent effect was best shown by comparing the relative area under curves and expressing them as relative percentages. The results are as follows; setting Carbowax 6,000 as 100:

| Vehicle | Relative % |
|---|---|
| Carbowax 6000 | 100 |
| PEG 400 | 105 |
| 15% Poloxamer 234 in Poloxamer 212 | 122 |

This result shows a 22 percent increase in the urinary excretion rate of salicylamide from the poloxamer vehicle over the Carbowax 6,000, although PEG 400 and Carbowax 6,000 dissolved more salicylamide. This increase in solubility may explain the slight increase in initial rate. However, the increase in the extent of excretion by the poloxamers may be attributed to the hypomotility effect on the GI tract induced by the poloxamers.

TABLE XX

Urinary Excretion Rate of Salicylamide After the Ingestion of 325 mg. Of The Drug Formulated In 250 mg. Of the Various Vehicles A. Polyethylene glycol 400
Salicylamide, mg/hr.

| Subject | 1 hr. | 2 hr. | 3 hr. | 4 hr. | 6 hr. |
|---|---|---|---|---|---|
| H | 49.8 | 118.3 | 61.7 | 33.7 | 9.3 |
| M | 36.2 | 124.1 | 66.0 | 32.4 | 12.1 |
| F | 84.0 | 111.7 | 43.6 | 22.5 | 4.6 |
| V | 35.3 | 94.0 | 60.3 | 31.7 | 15.6 |
| Average | 51.3 | 112.0 | 57.9 | 30.1 | 10.4 |
| Std. Deviation | ±22.8 | ±13.0 | ±9.8 | ±5.1 | ±4.7 |

B. Carbowax 6000
Salicylamide, mg/hr.

| Subject | 1 hr. | 2 hr. | 3 hr. | 4 hr. | 6 hr. |
|---|---|---|---|---|---|
| V | 58.6 | 116.3 | 52.8 | 28.2 | 10.0 |
| H | 96.7 | 92.3 | 32.6 | 23.3 | 13.1 |
| M | 37.2 | 63.3 | 38.2 | 41.5 | 25.1 |
| V | 18.1 | 107.9 | 80.8 | 41.1 | 16.3 |
| Average | 52.7 | 95.0 | 51.1 | 33.5 | 16.1 |
| Std. Deviation | ±33.7 | ±23.3 | ±21.6 | ±9.4 | ±6.5 |

C. 15% Poloxamer 234 in Poloxamer 212
Salicylamide, mg/hr

| Subject | 1 hr. | 2 hr. | 3 hr. | 4 hr. | 6 hr. |
|---|---|---|---|---|---|
| F | 19.0 | 105.9 | 91.5 | 36.7 | 9.0 |
| H | 20.2 | 139.6 | 102.9 | 33.6 | 9.4 |
| M | 8.6 | 62.2 | 69.0 | 119.2 | 32.3 |
| V | 19.9 | 69.5 | 108.3 | 55.6 | 13.8 |
| Average | 16.9 | 94.3 | 92.9 | 61.3 | 16.1 |
| Std. Deviation | ±5.6 | ±35.7 | ±17.4 | ±39.8 | ±11.0 |

EXAMPLE XXVII

A test was conducted to compare the gastrointestinal transit time of a Pluronic and other surfactants, by X-ray study, using fasted Beagle dogs as test animals.

The test composition (NO.1) was:

|  | % W/W |
|---|---|
| Barium sulfate for x-ray | 52.66 |
| Poloxamer 212 | 47.34 |
|  | 100.00 |

Sp. gr. = 1.71

A 30 cc. dose contains 24.3 grams of Poloxamer 212. The composition (NO.2) with surfactants was:

|  | % W/W |
|---|---|
| Barium sulfate for x-ray | 29.94 |
| Carbowax 6000 | 17.96 |
| PEG 400 | 35.93 |
| Distilled Water | 16.17 |
|  | 100.00 |

A 30 cc. dose contains 8.0 grams of carbowax 6000 and 16.0 grams of PEG 400.

Seven normal, healthy dogs of the Beagle strain that had been acclimated to the laboratory environment were used in this experiment.

The animals had been deparasitized and vaccinated and consumed their daily ration of Purina Chow supplemented by water ad libitum.

The animals were fasted for eighteen hours prior to dosing. On the day of the experiment sample No. 2 was diluted one part plus one part (v/v) with distilled water since its original consistency could not be administered orally.

Two of the test animals were dosed with 30 ml. of sample No. 1 and two were dosed with 60 ml. of the 1:1 dilution of sample No. 2. The test suspensions were placed directly into the stomach of each animal by means of a stomach tube.

X-rays were taken of the gastro-intestinal tract at 0 hours (pre-dosing) and at ½, 1, 1 ½, 2 ½, and 3 ½ hours post dosing.

One week later, the study was repeated with each surviving animal receiving the other suspension. X-rays were taken at the same time intervals as reported initially. A Westinghouse machine, Model No. 3065, was used to take the X-rays. Four hours post dosing each animal received its regular ration of Purina Chow.

Dosing Schedule

| Dog No. | Initial | X-Over |
|---|---|---|
| 543 | Sample No. 1 | dead |
| 571 | Sample No. 1 | Sample No. 2 |
| 572 | Sample No. 2 |  |
| 578 | Sample No. 1 |  |
| 576 | Sample No. 2 |  |
| 573 | Sample No. 2 | Sample No. 1 |
| 574 | Sample No. 2 | Sample No. 1 |

RESULTS

| Dog No. | Sample No. | Response |
|---|---|---|
| 543 | No. 1 | Animal vomited 1½ hours post dosing. Dead at 3½ hours post dosing. |
| 571 | No. 1 | Slight visualization in small intestine 1 hour post dosing. |
| 578 | No. 1 | Animal vomited ½ hour post dosing. |
| 572 | No. 2 | Sample visible in small intestine at 1½ hours post dosing. |
| 576 | No. 2 | Sample highly visible in small intestine at ½ hour post dosing. |
| 573 | No. 2 | Some visualization in small intestine at 1 hour post dosing. |
| 574 | No. 2 | Sample highly visible in small intestine at ½ hour post dosing. |
| 571 | No. 2 | Sample highly visible in small intestine at ½ hour post dosing. |
| 573 | No. 1 | Animal vomited 1½ hours post dosing. |
| 574 | No. 1 | Animal vomited 1½ hours post dosing |

Each of the animals which were fed barium sulfate in the poloxamer 212 base received 3.04 gram of poloxamer 212 per kilo gram of body weight. This dose level is greater than the $LD_{50}$ value determined for poloxamer 212, which is 2.83 gram per kilogram for both rats and beagle dogs. This is considered the reason why one of the five dogs receiving the poloxamer 212 composition died. The $LD_{50}$ test is not precise. The 2.83 gram per kilogram figure represents the mean $LD_{50}$. The statistical projection, based on the data accumulated in arriving at this mean, indicates that the $LD_{50}$ will range from 2.15 gram per kilogram to 3.75 gram per kilogram.

The results or responses as indicated in the report show two trends. As the dogs dosed with the test composition No. 1, the barium sulfate remained in the stomach for 3 ½ hours, the length of the experiment. With the dogs dosed with the other composition, No. 2, the barium sulfate appeared in the small intestine from ½ to 1 ½ hours after dosing.

EXAMPLE XXVIII

Twenty-seven gm of X-ray grade barium sulfate was mechanically suspended in 34.0 ml. of distilled water. Each of four dogs received this type of suspension. X-rays were taken at 0 hours and at 0.5, 1, 2, 3, and 4 hours after feeding the suspension to each dog. Dog No. 581 weighed 10.34 kilograms, Dog No. 585 weighed 7.18 kilograms, Dog No. 586 weighed 11.81 kilograms, and Dog No. 587 weighed 9.43 kilograms. In each case, the barium sulfate had moved into the intestinal tract by the first 0.5 hour of absorption. These data serve as a control or comparison for the data of Examples XVII and XXVII.

While in the foregoing, there has been provided a detailed description of particular embodiments of the present invention, it is to be understood that all equivalents obvious to those having skill in the art are to be included within the scope of the invention as claimed.

What we claim and desire to secure by Letters Patent is:

1. A method for enhancing gastrointestinal absorption of a drug of the type which is preferentially absorbed in the upper part of the gastrointestinal tract, said drug also being capable of having the amount of absorption extended by having the dwell time of said drug in the upper part of the gastrointestinal tract extended by prior induction of hypomotility, said method comprising the steps of sequentially absorbing in the upper part of the gastrointestinal tract an effective oral unit dosage amount of said drug, after first commencing absorbing in the upper part of the gastrointestinal tract about 30–95 percent by weight of a material, said percentage being relative to the total weight of said drug and said material, said material being a polyoxypropylene polyoxyethylene block polymer having the formula:

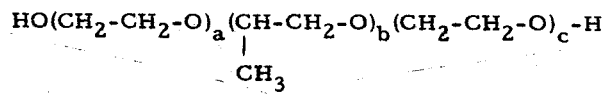

wherein
  $b$ represents a molecular weight of at least 900 and $a$ and $c$ represent a molecular weight of about 5–80 percent by weight of the total molecular weight of the polymer, reducing normal peristaltic action in said gastrointestinal tract with said polymer and thereby inducing a transient condition of hypomotility, particularly in the said upper part of the said gastrointestinal tract, said transient condition of hypomotility enhancing the desired gastrointestinal absorption of said drug, said polymer being the essential gastrointestinal absorption enhancing agent.

2. The method of claim 1 wherein $b$ of said polymer represents a molecular weight of 950–4,000 and $a$ and $c$ represent a molecular weight of 10–80 percent by weight of the total molecular weight of said polymer.

3. The method of claim 1 wherein $b$ of said polymer represents a molecular weight of 2,050–2,250 and $a$ and $c$ represent a molecular weight of about 30–50 percent by weight of the total molecular weight of said polymer.

4. The method of claim 1 wherein the said block polymer is about 30–90 percent by total weight of said drug and said material.

5. The method of claim 1 wherein said block polymer is about 50 percent of the total weight of said drug and said material.

6. The method of claim 1 wherein said sequential upper gastrointestinal tract hypomotility inducing and drug absorbing steps overlap or are simultaneous by presentation in the upper gastrointestinal tract in the same soft gelatin capsule.

* * * * *